United States Patent [19]
Kurata et al.

[11] Patent Number: 5,585,562
[45] Date of Patent: Dec. 17, 1996

[54] VIBRATION-SENSING GYRO

[75] Inventors: Nobuo Kurata, Hekinan; Nobuyoshi Sugitani, Toyota; Takashi Ozaki, Nagoya; Kenji Harada; Kimitoshi Tsuji, both of Toyota; Yutaka Nonomura, Nagoya; Takeshi Morikawa, Seto; Masayuki Okuwa, Nagoya; Kouji Tsukada, Seto, all of Japan

[73] Assignee: Toyota Jidosha Kabushiki Kaisha, Toyota, Japan

[21] Appl. No.: 640,399

[22] Filed: Apr. 30, 1996

Related U.S. Application Data

[63] Continuation of Ser. No. 318,392, Oct. 5, 1994, abandoned.

[30] Foreign Application Priority Data

Oct. 15, 1993 [JP] Japan ..................... 5-281596

[51] Int. Cl.$^6$ ....................................... G01P 9/04
[52] U.S. Cl. ....................................... 73/504.16
[58] Field of Search ........................... 73/504.16, 504.15, 73/504.12, 504.04; 310/329, 370

[56] References Cited

U.S. PATENT DOCUMENTS

| | | | |
|---|---|---|---|
| 4,930,351 | 6/1990 | Macy et al. | 73/505 |
| 5,056,366 | 10/1991 | Fersht et al. | 73/505 |
| 5,166,571 | 11/1992 | Konno et al. | 73/505 |
| 5,329,816 | 7/1994 | Soderkvist et al. | 73/504.16 |

FOREIGN PATENT DOCUMENTS

| | | |
|---|---|---|
| 38 05 250.4 | 8/1989 | Germany . |
| 2187621 | 7/1990 | Japan . |
| 2218913 | 8/1990 | Japan . |
| 4102013 | 4/1992 | Japan . |

OTHER PUBLICATIONS

J. Soderkvist, "Piezoelectric Beams and Vibrating Angular Rate Sensors" 8104 IEEE Transactions on Ultrasonics, Ferroelectric, and Frequency Control, 38, May 91, No. 3, New York, US, pp. 271–280.

Primary Examiner—John E. Chapman
Attorney, Agent, or Firm—Kenyon & Kenyon

[57] ABSTRACT

A vibration-sensing gyro composed of a light alloy such as duralumin includes a base and a first pair of tines projecting parallel to each other from the base. Piezoelectric elements are mounted on the root of the side faces of the first pair of tines to excite the first pair of tines along an X axis. The vibrations of the first pair of tines along the X axis are then propagated to a second pair of tines to vibrate the second pair of tines along the X axis. Piezoelectric elements are mounted on the root of the upper and the lower faces of the second pair of tines to detect vibrations of the second pair of tines along an Y axis. When the second pair of tines receives the Coriolis force based on an angular velocity ω around a Z axis and vibrates along the Y axis, the vibrations along the Y axis are detected as electric signals (alternating current voltages) by piezoelectric effects of the piezoelectric elements.

10 Claims, 11 Drawing Sheets

VIBRATION-SENSING GYRO

This application is a continuation of application Ser. No. 08/318,392, filed on Oct. 5, 1994, now abandoned.

BACKGROUND OF THE INVENTION

1. Field of the Invention

The present invention relates to vibration-sensing gyro having a pair of tines.

2. Description of the Related Art

Vibration-sensing gyros make the tines vibrate along a predetermined direction and detect the angular velocity in the following manner.

In the following description, it is assumed that a tine vibrates along an X axis in the plane which contains rectangular coordinate axis (X-Y plane). When the tine vibrating along the X axis rotates around a Z axis perpendicular to the X-Y plane, the angular velocity generates the Coriolis force acting on the tine along a Y axis. The Coriolis force depends upon the angular velocity. The angular velocity acting on the tine can accordingly be determined by measuring the Coriolis force indirectly as a distortion of the tine or directly using the piezoelectric effects of piezoelectric elements. A vibration-sensing gyro having a pair of tines as a tuning fork has been proposed in INTERNATIONAL LAYING-OPENGAZETTE W090/10196.

Such a vibration-sensing gyro is mounted on a vehicle to detect the yaw rate generated in turning the vehicle or record the running conditions of the vehicle.

The vibration-sensing gyro proposed in INTERNATIONAL LAYING-OPEN GAZETTE W090/10196, however, has the following drawbacks. The tines are composed of quartz crystal, and both an electrode for excitation and driving and an electrode for detecting the yaw rate are formed on each tine. These two electrodes have different purposes and thereby different electrode patterns. Each tine accordingly requires plural electrode patterns and thereby has a relatively complicated electrode structure, which makes the process or work for producing the electrodes rather complicated. Wirings leading to the respective electrodes should be arranged on one tine to prevent interference of each wiring with the other electrode. This naturally requires unfavorably complicated work and process for formation of the wirings.

Each tine should have dimensions to allow the plural electrodes to be simultaneously formed thereon, which makes the entire vibration-sensing gyro rather bulky.

In order to prevent interference of the wirings with the electrodes, only the thin wirings can be formed on the tine having the space for the plural electrodes. This unfavorably limits the voltages applicable onto the excitation electrode.

A large distortion is generated on the root of a tine during vibrations of the tine. It is accordingly preferable that both the excitation electrode and the vibration detecting electrode (electrode for detecting the yaw rate) are formed on the root of each tine in order to vibrate the tine with high efficiency and detect the vibrations of the tine with high sensitivity. Since the plural electrodes are formed on each tine, however, either the excitation electrode or the vibration detecting electrode should be disposed on the end of the tine. When the excitation electrode is formed on the end of the tine, the restricted voltage applicable onto the excitation electrode prevents the tine from vibrating with a sufficiently large amplitude. This lowers the detection sensitivity of the yaw rate based on the Coriolis force. These problems also arise in vibration-sensing gyros which vibrate a metal tine with piezoelectric elements such as PZT and detect the yaw rate.

SUMMARY OF THE INVENTION

The object of the invention is thus to simplify and down-size a structure of a vibration-sensing gyro.

The above and the other related objects are realized by a vibration-sensing gyro comprising a vibration-sensing element having a base and first and second tines projecting from the base. The first and second tines are fixed to the base and arranged in a plane so that, while the first tine vibrates along one axis in a plane which contains one of the rectangular coordinate axes, the vibrations propagate from the first tine to the second tine through the base. The vibration-sensing gyro further comprises: first excitation means disposed on the first tine for vibrating the first tine along the one axis; and first detection means disposed on the second tine for detecting vibrations of the second tine in a direction perpendicular to the direction of the propagated vibrations.

In the vibration-sensing gyro of the invention having the above structure, the first excitation means disposed on the first tine excites and vibrates the first tine along the one axis (referred to as the X axis in the following description) in the plane which contains a rectangular coordinate axis. The vibrations along the X axis are propagated to the second tine via the base so as to vibrate the second tine. The second tine has the first detection means for detecting vibrations of the second tine along another axis (referred to as the Y axis in the following description) perpendicular to the X axis while the second tine vibrates in a direction along the X axis. When the vibration-sensing gyro having the first and second tines vibrating along the X axis rotates around an axis (Z axis) perpendicular to the X-Y plane, both the tines receive the Coriolis force based on the angular velocity and vibrate along the Y axis. The first detection means disposed on the second tine then detects the vibrations along the Y axis. In the structure of the invention, each tine has either one of the first excitation means and the first detection means, which are separately formed in the vicinity of the common base, that is, on the root of the respective tines.

According to one aspect of the invention, the vibration-sensing element is formed in an H shape which comprises the first and second tines projecting from the base in a first direction and third and forth tines projecting from the base in a second direction opposite to the first direction. The third and forth tines have substantially the same structures as the first and second tines, respectively. The vibration-sensing gyro further comprises: second excitation means disposed on the third tine for harmonically vibrating the third tine in either of an equiphase and in an antiphase with respect to the vibrations of the first tine; and second detection means disposed on the forth tine for detecting vibrations of the forth tine in a direction perpendicular to the direction of the propagated vibrations.

In the vibration-sensing gyro, the first excitation means vibrates the first tine along the X axis, and the vibrations along the X axis are propagated to the second tines via the base. The first and second detection means then detect the vibrations of the second and forth tines along the Y axis. The third tine has only the second excitation means. In this structure, each tine has any one of the first excitation means, the second excitation means, the first detection means, and second detection means, which are separately formed in the vicinity of the common base, that is, on the root of the respective tines.

The second excitation means harmonically vibrates the third tine in an equiphase or in an antiphase with respect to the vibrations of the first tine. The equipbase or the antiphase vibrations are propagated to the forth tine. Each tine of the vibration-sensing gyro can be set in a first vibration mode where the vibrations of the respective first and the third tines have identical directions or in a second vibration mode where those tines have opposite directions. The respective second and the forth tines can accordingly be vibrated in identical directions or different directions. The respective first and second detection means disposed on the second and the forth tines detect the vibrations along the Y axis, thus effectively compensating for external disturbances in detection signals.

According to another aspect of the invention, the vibration-sensing element is formed in an H shape which comprises the first and second tines projecting from the base in a first direction and third and fourth tines projecting from the base in a second direction opposite to the first direction. The third and fourth tines have substantially the same structures as the first and second tines, respectively. The vibration-sensing gyro further comprises: feed-back detection means disposed on the third tine for detecting vibrations of the third tine along the one axis; second detection means disposed on the forth tine for detecting vibrations of the forth tine in a direction perpendicular to the direction of the propagated vibrations; and feed-back control means for executing feed-back control of the first and second excitation means in response to the detection of the vibration by the feed-back detection means.

In the vibration-sensing gyro, the first excitation means vibrates the first tine along the X axis, and the vibrations along the X axis are propagated to the second tine as well as both the third and the forth tines. The first and the second detection means then detect the vibrations of the second and the forth tines along the Y axis. The third tine has only the feed-back detection means. In this structure, each tine has any one of the first excitation means, the feed-back detection means, the first detection means, and the second detection means, which are separately formed in the vicinity of the common base, that is, on the root of the respective tines.

The feed-back detection means detects the vibrations of the third tine along the X axis, and the feed-back control means executes feed-back control of the excitation means in response to the detection of the vibration by the feed-back detection means. This ensures the stable vibrations of the first tine along the X axis with a fixed amplitude.

According to still another aspect of the invention, the vibration-sensing element is composed by joining a first tuning fork and a second tuning fork, where each of the tuning forks have a base and two prolonged tines projecting from the base and the two tuning forks are joined with each other via the respective bases. The first tuning fork has the first excitation means on one of the tines, and the second tuning fork has the first detection means on one of the tines.

In this vibration-sensing gyro, two tuning forks are joined with each other via the respective bases, and the two prolonged tines project from the base of each tuning fork. The constricted base with respect to the two tines can efficiently propagate vibrations of each tine.

In any structure described above, while one tine vibrates along the X axis, the vibrations along the X axis are propagated to the other tine via the base. The tines may be made of any material which can propagate the vibrations. Typical examples of the material include metals, crystal bodies such as quartz crystals and semi-conductors, glasses, and ceramics.

The excitation means may be selected arbitrarily based on the material of the tines as long as it can make one tine vibrate along the X axis. When the tines are made of a metal, a crystal body such as quartz crystal or semi-conductor, glass, or ceramics, for example, the excitation means may be piezoelectric elements such as PZT, which excite the tine by reverse piezoelectric effects of the elements. When the tines are composed of a material having piezoelectric effects, like a crystal body such as quartz crystal or semi-conductor or ceramics, electrodes may be applied as the excitation means to excite the tine by reverse piezoelectric effects of the tine. In another structure, the excitation means varies the induction magnetic force or the capacitive charge acting on the tine to vibrate the tine. The detection means may also be piezoelectric elements such as PZT or electrodes which detect the vibrations of the tine by piezoelectric effects. Alternatively, the detection means detects the vibrations of the tine based on the variation in the induction magnetic force or the capacitive charge.

These and other objects, features, aspects, and advantages of the present invention will become more apparent from the following detailed description of the preferred embodiments with the accompanying drawings.

DESCRIPTION OF THE PREFERRED EMBODIMENT

Figure 1:
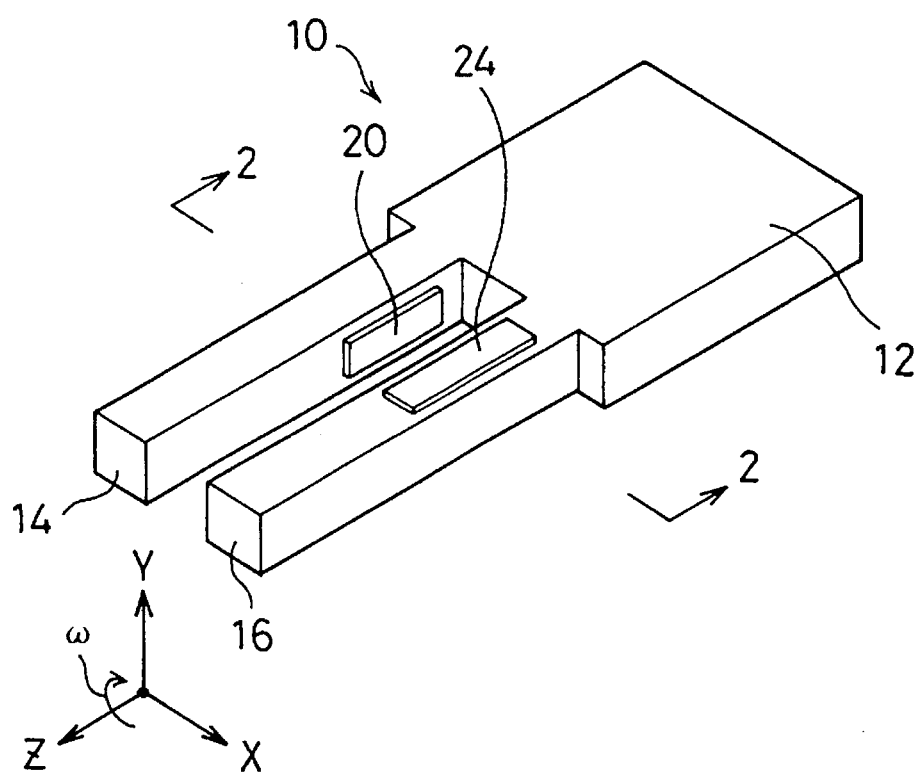
FIG. 1 is a perspective view schematically illustrating a vibration-sensing gyro 10 as a first embodiment according to the invention.

A typical vibration-sensing gyro embodying the present invention is described with the accompanying drawings. FIG. 1 is a perspective view illustrating a vibration-sensing gyro 10 of a preferred embodiment according to the invention. The vibration-sensing gyro 10 includes a base 12 and first and second tines 14 and 16 projecting parallel to each other from the base 12. The vibration-sensing gyro 10 is manufactured by machine working a vibration-propagating metal plate, typically a light alloy such as duralumin, to the specific shape shown in FIG. 1. Dimensions (length×width× thickness) of the vibration-sensing gyro 10 are 60 mm×10 mm×3 mm while those of each tine 14 or 16 are 40 mm×3 mm×3 mm.

Since the vibration-sensing gyro 10 is composed of a vibration-propagating metal, while one of the two tines, for example, the first tine 14, vibrates along an X axis in the plane which contains a rectangular coordinate axis as shown in FIG. 1, the vibrations are propagated to the second tine 16. Continuous vibrations of the first tine 14 along the X axis accordingly ensure continuous vibrations of the second tine 16 along the X axis. The vibration-sensing gyro 10 is designed and trimmed to make resonance frequencies of the first and the second tine 14 and 16 coincide with each other along the X axis.

Figure 2:
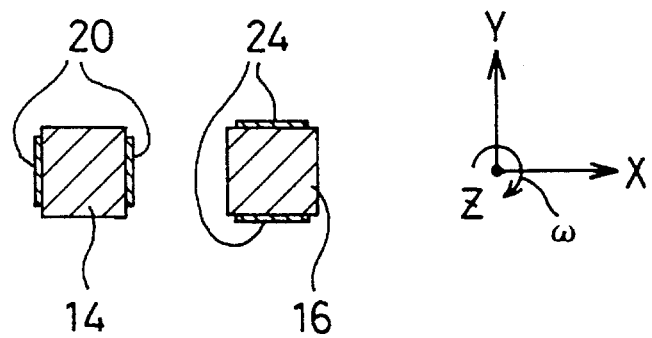
FIG. 2 is an enlarged cross sectional view taken on the line 2—2 of FIG. 1.

As shown in FIG. 1 and FIG. 2 which is an enlarged cross section view taken on the line 2—2 of FIG. 1, each tine has a pair of piezoelectric elements adhering and fixed thereto. The first tine 14 has a pair of piezoelectric elements 20 adhering and fixed to the side faces thereof (faces parallel to the Y-Z plane perpendicular to the X axis) whereas the second tine 16 has a pair of piezoelectric elements 24 adhering and fixed to the upper and lower faces thereof (faces parallel to the X-Z plane perpendicular to the Y axis). Each pair of piezoelectric elements 20 or 24 arranged opposite to each other have a specific wiring for preventing a conductive line (not shown) from interfering with vibrations of each tine. And each pair of piezoelectric elements 20 or 24 are fixed at between zero and 50 per cent of each respective tine length of the first tine 14 and the second tine 16 from the base 12.

Figure 3:
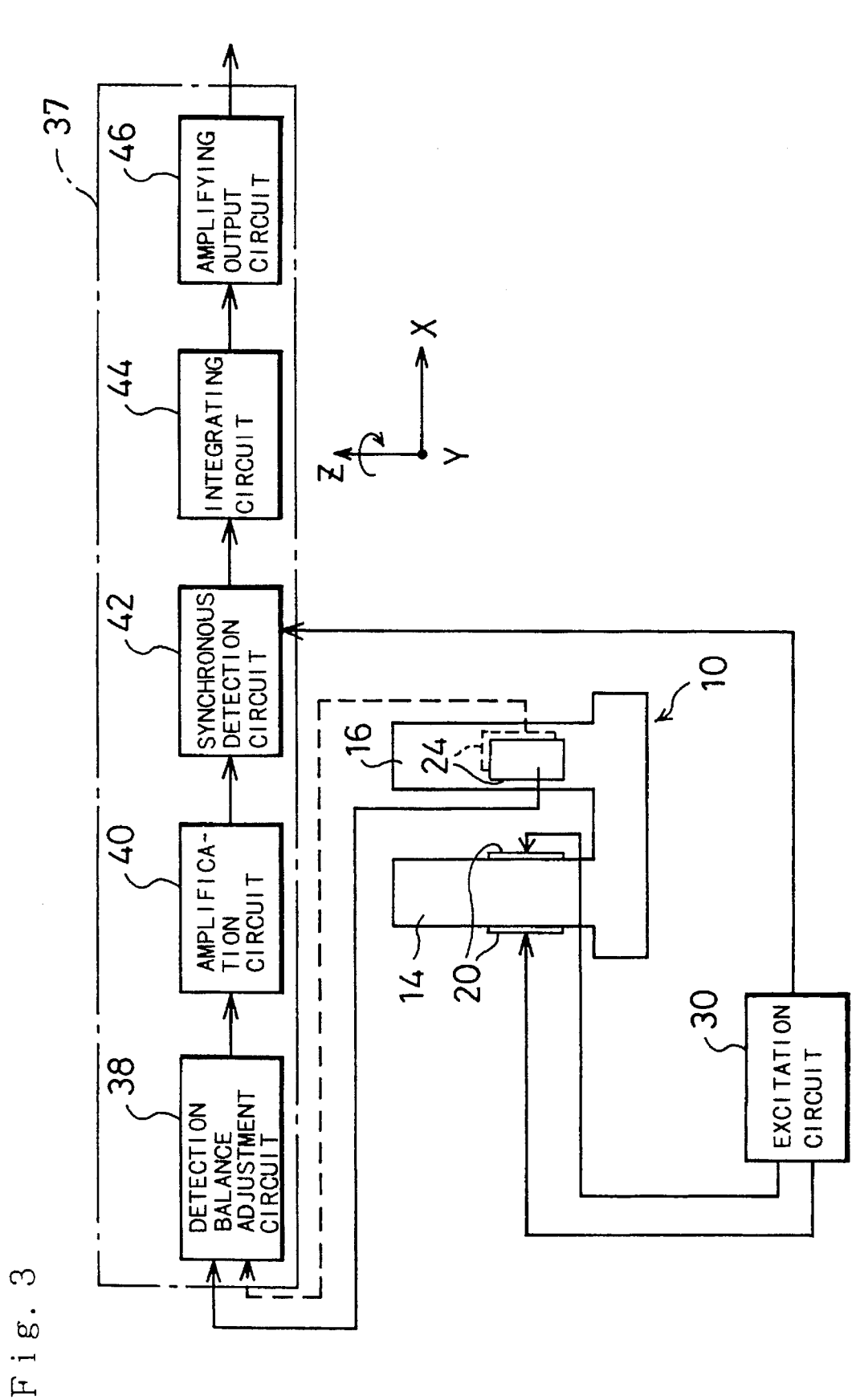
FIG. 3 is a block diagram showing an electrical structure including the vibration-sensing gyro 10.

A circuit structure of the vibration-sensing gyro 18 is described based on the block diagram of FIG. 3. The pair of piezoelectric elements 20 on the first tine 14 of the vibration-sensing gyro 10 connect with an excitation circuit 30 while the pair of piezoelectric elements 24 on the second tine 16 connect with a detection circuit 37 as shown in FIG. 3.

The detection circuit 37 includes: a detection balance adjustment circuit 38 for adjusting the phase of electric signals (alternating current voltages; hereinafter referred to as ac voltages) generated by piezoelectric effects of the piezoelectric elements 24 on the second tine 16; an amplification circuit 40 for amplifying the output level of the electric signals adjusted by the detection balance adjustment circuit 38; a synchronous detection circuit 42 for inverting a negative portion of the ac voltage (electric signal) to a positive voltage for rectification; an integrating circuit 44 for converting the positive voltage-electric signal to a rectified voltage-electric signal; and an amplifying output circuit 46 for amplifying the output level of the rectified voltage-electric signal.

The excitation circuit 30 applies to the piezoelectric elements 20 on the first tine 14 ac voltages of a specific frequency identical with the resonance frequency of the first tine 14 along the X axis. The pair of piezoelectric elements 20 respectively expand and contract in response to the voltage by reverse piezoelectric effects. The ac voltages having phases different from each other by 180 degrees are respectively applied onto the pair of piezoelectric elements 20. This means that one piezoelectric element 20 expands along a longitudinal direction of the first tine 14 while the other piezoelectric element 20 contracts along the first tine 14 or vice versa. As a result, the first tine 14 vibrates along the X axis shown in FIG. 3 at its resonance frequency. The vibrations of the first tine 14 along the X axis are then propagated to the second tine 16 so as to vibrate the second tine 16 along the X axis.

While the vibrations of the first tine 14 are propagated to the second tine 16 to make the second tine 16 vibrate along the X axis, an angular velocity ω acts on the vibration-sensing gyro 10 around the Z axis perpendicular to the X-Y plane, the second tine 16 receives the Coriolis force expressed as the following equation to vibrate along the Y axis:

$$F = 2 m V \omega$$

where m represents a vibrating mass of the second tine 16 and V represents a velocity of the vibrating mass.

The velocity $V_x$ of the vibrating along the X axis mass expressed as the following equation is proportional to an amplitude A of the vibrations of the second tine 16 along the X axis under the condition of a constant resonant frequency f:

$$V_x = A\lambda \cos \lambda t$$

Where $\lambda$ is a function of the vibration cycle T ($\lambda = 2\pi/T$). $V_x$, therefore, depends on the vibration frequency $F = 1/T$.

The Coriolis force F increases with an increase in the amplitude A of the vibrations of the second tine 16 along the X axis.

As described above, the second tine 16 receives the Coriolis force F to vibrate along the Y axis simultaneously with receiving the vibrations along the X axis propagated from the first tine 14, thereby totally moving on an elliptical orbit. The pair of piezoelectric elements 24 on the second tine 16 expand and contract according to the Y-axis vibrations of the elliptical movement and generate electric signals of voltages corresponding to the expansion and contraction of each element by the piezoelectric effects of the elements 24. The electric signals reflecting the expansion and contraction of each element are ac voltages having the greater output level with respect to the greater expansion and contraction. Namely, the greater expansion and contraction of the piezoelectric elements 24 on the second tine 16 preferably enhances the output level of the electric signals for the higher detection sensitivity.

The electric signals generated by the piezoelectric elements 24 on the second tine 16 are input into the detection balance adjustment circuit 38, which adjusts the phases of the electric signals generated by the respective piezoelectric elements. The amplification circuit 40 then amplifies the output level of the electric signals. The synchronous detection circuit 42 detects the ac voltages of the electric signals synchronously with a reference signal of the excitation circuit 30 and converts the negative portion of the ac voltages to electric signals of positive voltages. The integrating circuit 44 converts the positive voltage-electric signals to rectified voltage-electric signals, which are amplified and output by the amplifying output circuit 46. Electric signals reflecting the vibrations of the second tine 16 along the Y axis induced by the Coriolis force F are propagated through the detection circuit 37 including the detection balance adjustment circuit 38, and output to an electronic control system (not shown) as linear electric signals representing the direction and magnitude of the angular velocity ω around the Z axis. The vibration-sensing gyro 10 mounted on a vehicle can detect the turning direction of the vehicle and the magnitude per unit time.

As described above, the vibration-sensing gyro 10 of the first embodiment has a simple structure that only a pair of piezoelectric elements are fixed onto each tine for a single purpose, that is, for excitation or detection. More concretely, the pair of piezoelectric elements 20 are mounted on the first tine 14 for making the first tine 14 vibrate along the X axis. The pair of piezoelectric elements 24 are fixed onto the second tine 16 for detecting the vibrations of the second tine 16 along the Y axis. The vibration-sensing gyro 10 of the embodiment does not require plural pairs of piezoelectric elements to adhere to a single tine for different purposes. This simplifies and down-sizes the entire structure of the vibration-sensing gyro.

The vibration-sensing gyro 10 of the embodiment has piezoelectric elements separately fixed onto the root of each tine which has an extreme distortion due to the vibration. In the vibration-sensing gyro 10 of the embodiment, the pair of piezoelectric elements 20 ensure efficient vibrations of the first tine 14 whereas the pair of piezoelectric elements 24 detect the Coriolis force or the direction and the magnitude (yaw rate) of the angular velocity ω at high sensitivity.

Figure 4:
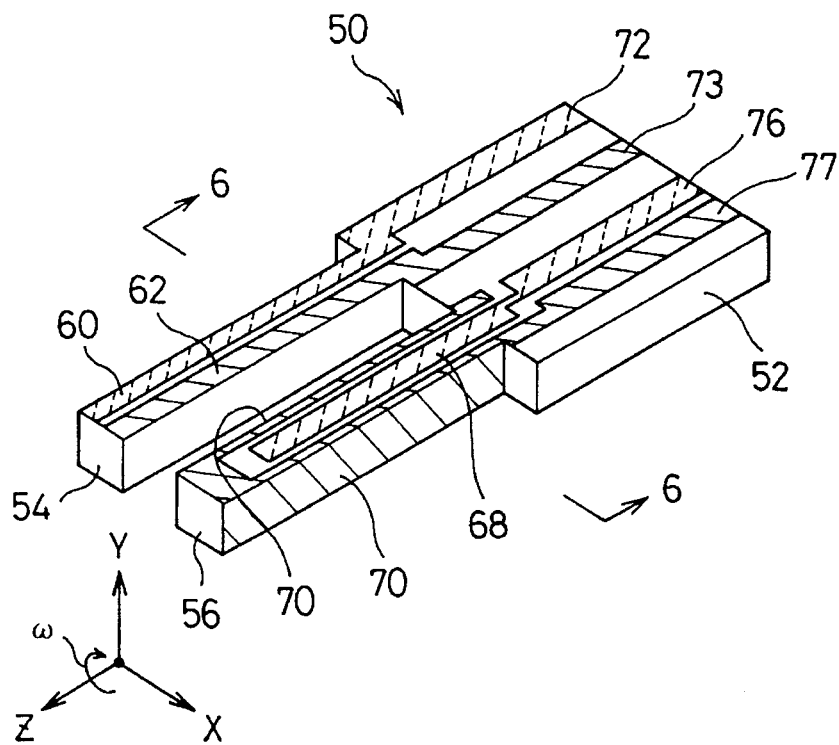
FIG. 4 is a perspective view schematically illustrating another vibration-sensing gyro 50 as a second embodiment according to the invention.
Figure 5:
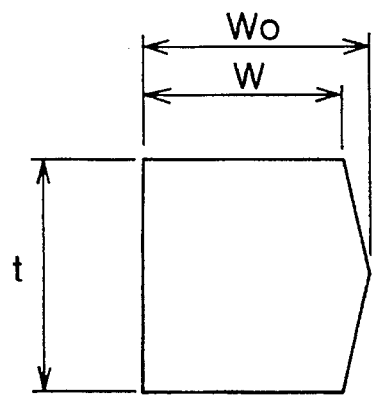
FIG. 5 shows widths and thicknesses of first and second tines 54 and 56 of the vibration-sensing gyro.

Another vibration-sensing gyro 50 is described as a second embodiment according to the invention. The vibration-sensing gyro 50 includes a base 52 and a pair of tines 54 and 56 projecting parallel to each other from the base 52 as shown in FIG. 4, and is produced by etching a Z-cut face of a plate composed of a single quartz crystal (quartz crystal plate). When a quartz crystal plate having a thickness of t is etched by a width W, the etched faces of the first tine 54 and the second tine 56 are inclined due to the crystal structure as shown in FIG. 5. In the second embodiment, the first tine 54 and the second tine 56 are formed to have a preset minimum width W of the quartz crystal plate by taking account of a width W0 increased by the inclination, so that the ratio W/t of the preset width W of the quartz crystal plate to the plate thickness t ranges from 0.5 to 1.3.

The vibration-sensing gyro 50 is composed of quartz crystal which exerts piezoelectric effects. A couple of electrodes are directly attached to the surface of the second tine 56 for exciting the second tine 56 along the X axis whereas another couple of electrodes are directly fixed to the surface of the first tine 54 for detecting vibrations of the first tine 54 along the Y axis.

Figure 6:
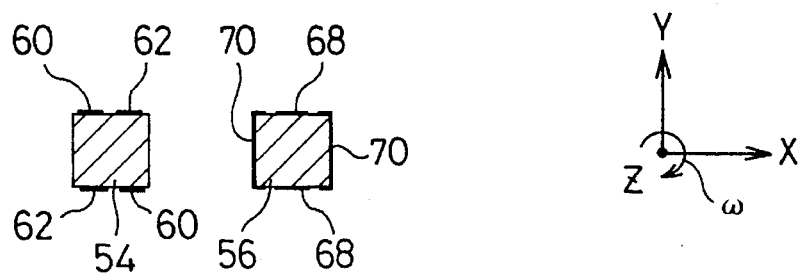
FIG. 6 is an enlarged cross sectional view taken on the line 6—6 of FIG. 4.

As shown in FIG. 4 and FIG. 6 which is an enlarged cross sectional view taken on the line 6—6 of FIG. 4, a positive electrode 60 and a negative electrode 62 are disposed adjacent to each other on both the upper and the lower faces (faces parallel to the X-Z plane perpendicular to the Y axis) of the first tine 54. The second tine 56, on the other hand, has positive electrodes 68 on both the upper and the lower faces thereof and negative electrodes 70 on both the side faces thereof (faces parallel to the Y-Z plane perpendicular to the X axis). The negative electrodes 70 on the side faces of the second tine 56 are electrically connected to each other at the end of the second tine 56 as shown in FIG. 4. The base 52 has wirings 72, 73, 76, and 77 respectively connecting with the electrodes 60, 62, 68, and 70.

In the drawing of FIG. 4, the positive electrodes and the corresponding wirings are filled with the hatched broken lines while the negative electrodes and the corresponding wirings are filled with the hatched solid lines.

Since the negative electrodes 70 on both the side faces of the second tine 56 are electrically connected to each other at the end of the second tine 56, the wiring 77 leading to the negative electrodes 70 of the second tine 56 is formed only the upper face of the base 52. The other wirings 72, 73, and 76 are, on the other hand, formed on both the upper and the lower faces of the base 52. These electrodes and wirings are formed by known semiconductor technology, such as formation of a conductive thin fill on the surface of the vibration-sensing gyro 50 or photo resist processing.

The positive electrode 68 and the negative electrode 70 of the vibration-sensing gyro 50 connect with an excitation circuit or a vibrating circuit via the wirings 76 and 77. Like the vibration-sensing gyro 10 of the first embodiment, the vibration-sensing gyro 50 makes the second tine 56 vibrate along the X axis while detecting vibrations of the second tine 56 along the Y axis, thereby detecting the Coriolis force or the yaw rate at high sensitivity. In the vibration-sensing gyro 50 of the second embodiment, each tine 54 or 56 has electrodes only for a single purpose, that is, either the electrodes for excitation or those for detection of vibrations. No specific wirings leading to the electrodes are required for supply of electricity. Electrodes can be preferably formed on each tine without taking account of interference of wirings with electrodes. The vibration-sensing gyro 50 has thick wirings for application of high voltages and allows each tine to vibrate with a greater amplitude so as to improve the sensitivity of detection. The first tine 54 and the second tine 56 of the vibration-sensing gyro 50 are formed by etching technology as shown in FIG. 4, so that the ratio W/t of the width W (thickness along the X axis) to the plate thickness t (thickness along the Y axis) ranges between 0.5 and 1.3. The vibration-sensing gyro 50 can set resonance frequencies in the X-axis direction and in the Y-axis direction substantially equal to each other, thus effectively improving the detection sensitivity of the yaw rate.

Figure 7:
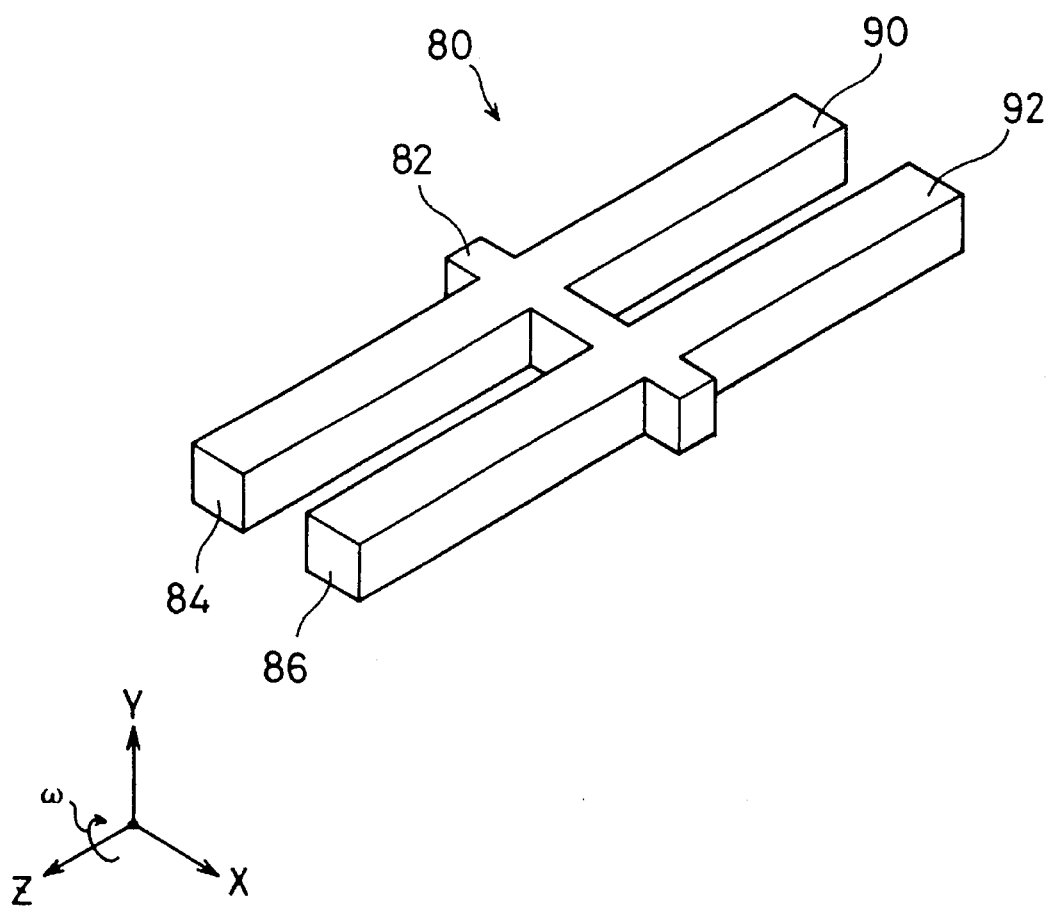
FIG. 7 is a perspective view schematically illustrating still another vibration-sensing gyro 80 as a third embodiment according to the invention.

Both the vibration-sensing gyro 10 of the first embodiment and the vibration-sensing gyro 50 of the second embodiment include two tines projecting parallel to each other from the common base. The invention is, however, not limited to this specific shape but may have another shape as shown in FIG. 7. An H-shaped vibration-sensing gyro 80 shown in FIG. 7 includes a base 82, a pair of tines 84 and 86 projecting parallel to each other from the base 82 in a first direction, and another pair of tines 90 and 92 projecting parallel to each other from the base 82 in a second direction which is opposite to the first direction. In the H-shaped vibration-sensing gyro 80, two tines are used for excitation whereas the other two tines are used for detecting the angular velocity. One of the two excitation tines is used for generating vibrations along the X axis required for detection of the angular velocity, and the other for harmonic vibrations or feed-back control.

The tine for harmonic vibrations has the function of generating vibrations along the X axis and vibrates harmonically with vibrations of the other excitation tine. Vibrations of the two excitation tines along the X axis may be set in an equiphase or in an antiphase by making the phase of the driving ac voltage for the harmonic vibration tine different from the phase of the driving ac voltage for the other excitation tine. The tine for harmonic vibrations controls the vibration mode of the g-shaped vibration-sensing gyro, which accordingly stabilizes vibrations of each tine along the X axis and reduces off-set outputs of the detection signals.

One of the two excitation tines used for feed-back control detects excited vibrations of the other excitation tine along the X axis so as to maintain the excitation amplitude substantially constant. This allows the sensor characteristics to be preferably stabilized in a wide temperature range and over a long time period.

The two tines set for detection of the angular velocity can generate the mean output by addition or the differential output by subtraction based on the phases of two outputs from the respective tines. This effectively compensates for errors due to the acceleration, the outside vibrations, and the temperature change, and generates stable and noiseless outputs.

Each tine has a vibration driving element or a detection element. Piezoelectric elements for excitation are fixed onto both the side faces of the root of the excitation tine, like the first tine 14 of the vibration-sensing gyro 10 of the first embodiment. Piezoelectric elements for excitation and feed-back control piezoelectric elements for detecting the amplitude of the excited vibrations are fixed onto both the side faces of the root of the harmonic vibration tine and the feed-back control tine, respectively. Piezoelectric elements for detecting vibrations proportional to the angular velocity are attached to both the upper and the lower faces of the root of each tine for detecting the angular velocity, like the second tine 16 of the vibration-sensing gyro 10.

The vibration-sensing gyro 80 has several modifications according to the selection of tines.

In a first modification, a pair of tines 84 and 86 are arranged opposite to another pair of tines 90 and 92 across the base 82 as shown in FIG. 7. The first pair of tines 84 and 86 are excited to vibrate along the X axis whereas the second pair of tines 90 and 92 receive the vibrations along the X axis propagated from the first pair to vibrate along the X axis. The first pair of tines 84 and 86 have X-axis excitation means for exciting vibrations of the tines 84 and 86 along the X axis, like the piezoelectric elements 20 on the first tine 14 of the vibration-sensing gyro 10 or the positive electrodes 68 and the negative electrodes 70 on the second tine 56 of the vibration-sensing gyro 50. The second pair of tines 90 and 92 have Y-axis vibration detecting means for detecting the vibrations of the tines 90 and 92 along the Y axis, like the piezoelectric elements 24 on the second tine 16 of the vibration-sensing gyro 10 or the positive electrodes 60 and the negative electrodes 62 on the first tine 54 of the vibration-sensing gyro 50. In this structure, the tine 84 is used for excitation, the tine 86 for harmonic vibrations, and the tines 90 and 92 for detecting the angular velocity.

Figure 8:
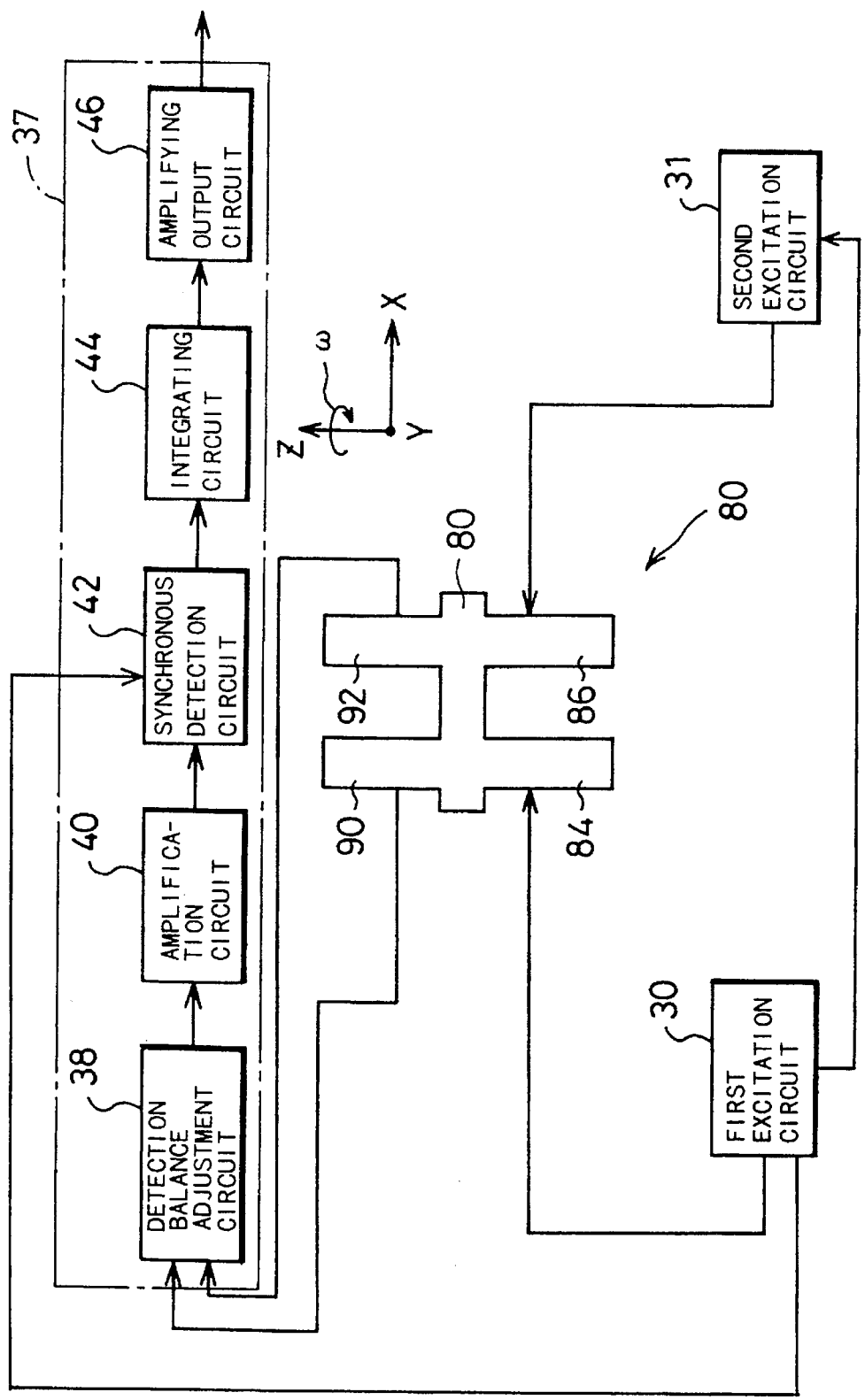
FIG. 8 is a block diagram showing a typical electrical structure including the vibration-sensing gyro 80.

With referring to FIG. 8, the X-axis excitation means of the excitation tine 84 connects with a first excitation circuit 30, the X-axis excitation means of the harmonic vibration tine 86 with a second excitation circuit 31 which is equivalent to the first excitation circuit 30, and the Y-axis vibration detecting means of the detection tines 90 and 92 with the detection balance adjustment circuit 38 of the detection circuit 37. The first and the second excitation circuits 30 and 31 are connected to each other and in a master-slave relationship for mutually transmitting and receiving data. The first excitation circuit 30 works as a master circuit, and the second excitation circuit 31 outputs ac voltages having the frequency identical with that of the first excitation circuit 30 with the adjusted amplitude and phase. This results in determining the excitation mode of the vibration-sensing gyro 80. The other constituents shown in FIG. 8 have the same functions as those of the constituents of the vibration-sensing gyro 10 of the first embodiment and are thus not described here.

Figure 9:
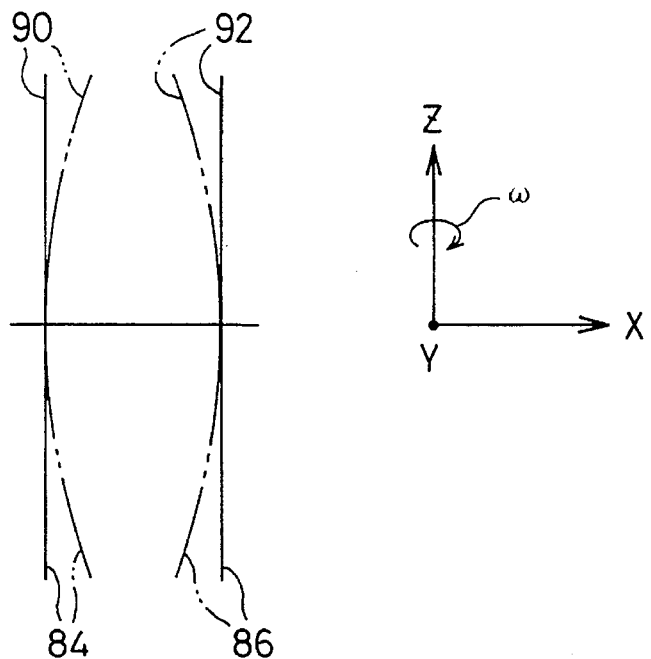
FIG. 9 shows a typical vibration mode of the vibration-sensing gyro 80.

The first pair of tines 84 and 86 are excited to vibrate along the X axis with a phase shift of 180 degrees illustrated as a typical vibration mode in the schematic view of FIG. 9. This vibration mode reverses the direction of vibrations of the second pair of tines 90 and 92 along the X axis, which are propagated from the first pair of tines 84 and 86. In the vibration-sensing gyro 80 of the first structure, when the vibration-sensing gyro 80 rotates around the Z axis to give the angular velocity to the second pair of tines 90 and 92, the direction of the Coriolis force acting on both the tines 90 and 92 can be inverted. The vibration-sensing gyro 80 of the first modification can effectively compensate for outputs of deflection of the tines caused by external disturbances applied onto the tines, such as transverse acceleration not based on turning of the vehicle, thereby improving the detection sensitivity of the yaw rate.

In a second modification having a first pair of tines 84 and 86 projecting from the base 82 in one direction and a second pair of tines 90 and 92 projecting from the base 82 in the opposite direction, the tines 84 and 90 have X-axis excitation means for exciting the tines 84 and 90 along the X axis while the other tines 86 and 92 have Y-axis vibration detecting means for detecting vibrations of the tines 86 and 92 along the Y axis. In this structure, the tine 84 is used for excitation, the tine 90 for harmonic vibrations, and the tines 86 and 92 for detecting the angular velocity. An electrical structure of the second modification is shown in FIG. 10.

Figure 11:
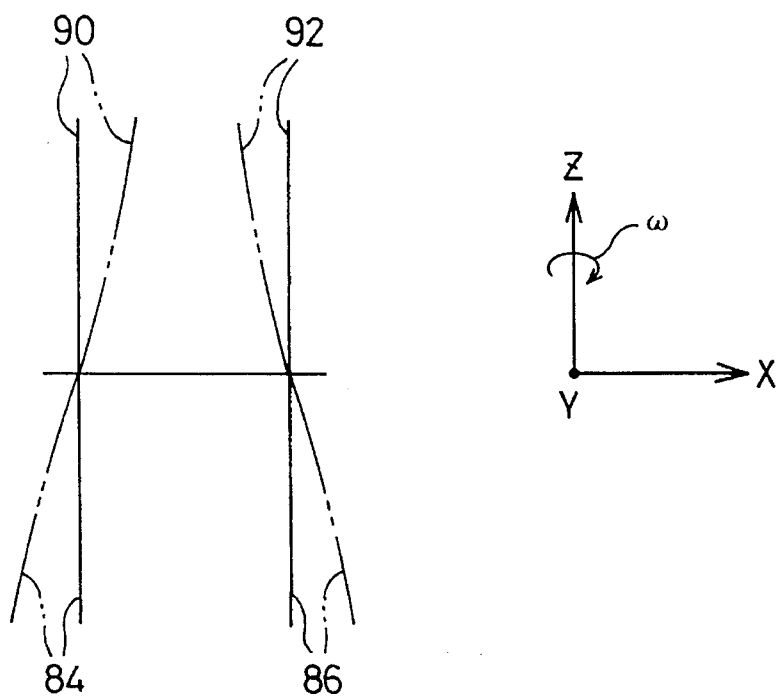
FIG. 11 shows another typical vibration mode of the vibration-sensing gyro 80.
Figure 10:
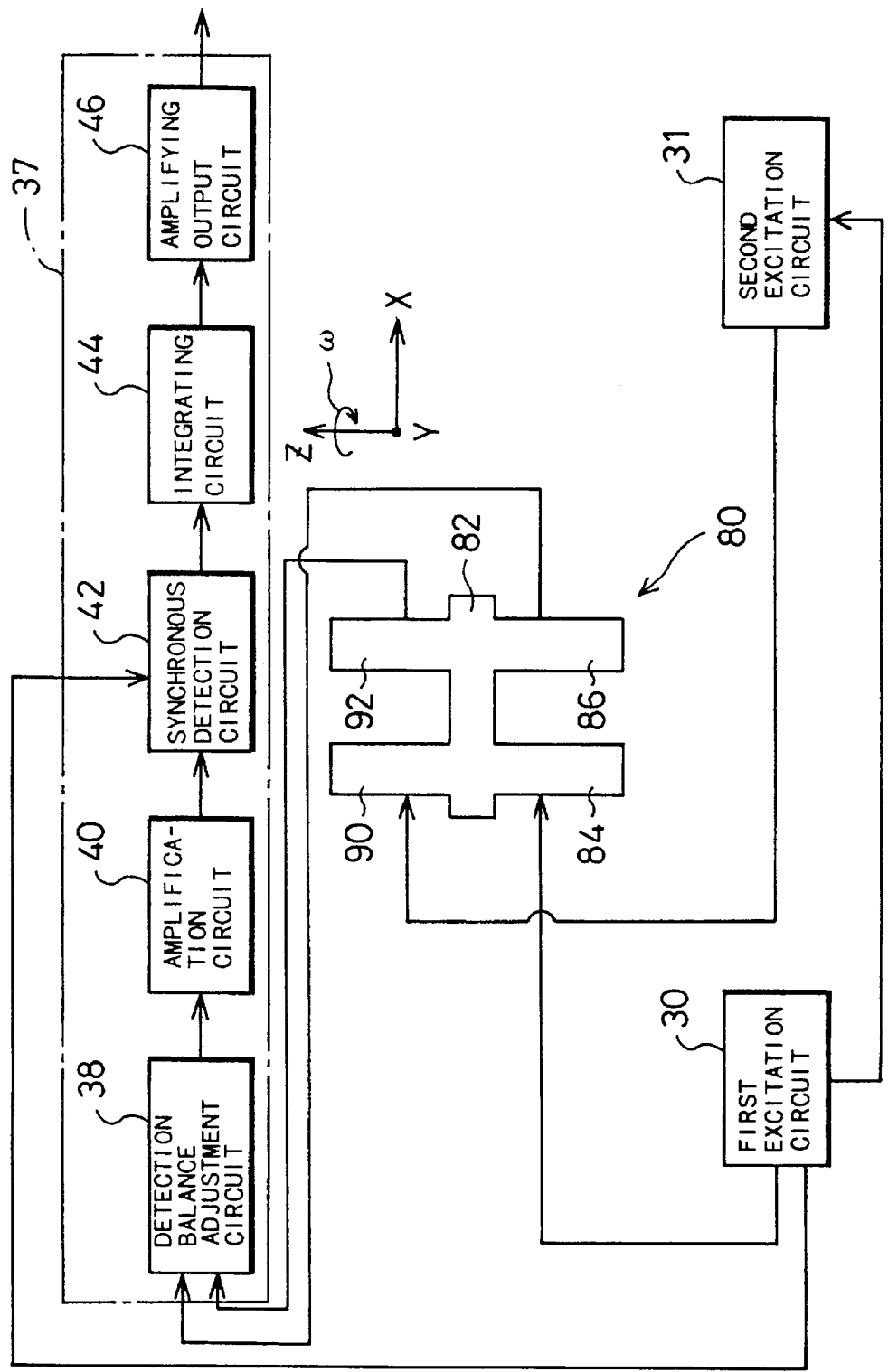
FIG. 10 is a block diagram showing an alternative electrical structure including the vibration-sensing gyro 80.

The X-axis excitation means of the excitation tine 84 connects with the first excitation circuit 30, the X-axis excitation means of the harmonic vibration tine 90 with the second excitation circuit 31, and the Y-axis vibration detecting means of the detection tines 86 and 92 with the detection balance adjustment circuit 38 of the detection circuit 37 as shown in FIG. 10. In the same manner as the first modification, the first and the second excitation circuits 30 and 31 excite the tines 84 and 90, where the vibration mode is set as shown in the schematic view of FIG. 11. Alternating current voltages are applied onto the piezoelectric elements of the tines 84 and 90 under such a condition that the phase of the excitation ac voltages output from the second excitation circuit 31 is shifted by 180 degrees from the phase of the excitation ac voltages output from the first excitation circuit 30. The piezoelectric elements on the tine 90 expand with contraction of the piezoelectric elements on the tine 84, and the opposite contraction-expansion process occurs subsequently. The tines 84 and 90 vibrate in the vibration mode shown in FIG. 11 through repetition of the expansion and contraction.

This vibration mode reverses the direction of vibrations of the tines 86 and 92 along the X axis, which are propagated from the tines 84 and 90. Like the first modification, the vibration-sensing gyro 80 of the second modification can effectively compensate for outputs due to external disturbances, thereby improving the detection sensitivity of the yaw rate.

The piezoelectric elements used for detection generally have high output impedances and thereby have a problem of being easily affected by electric-field induction noises. In the vibration-sensing gyro of the second modification, the excitation tine 84 and the harmonic vibration tine 90, which excites or vibrates harmonically with the excitation tine 84, are projected in the opposite directions from the base 82 but arranged on the same side of the base 82 as shown in FIG. 10. It means that wirings required for applying excitation ac voltages to the piezoelectric elements of these tines 84 and 90 can be collected on one side of the base 82. The wirings for excitation can thus be spatially separate from wirings for detection connected to the piezoelectric elements on the vibration detecting tines 86 and 92. This structure effectively prevents the ac electric field-induction noises due to application of the excitation ac voltages from overlapping the wirings for detection, thereby enhancing the detection sensitivity. The antiphase of ac voltages applied onto the tines 84 and 90 can effectively compensate for the electric field discharged outside. This efficiently suppresses the ac electric field generated by application of excitation ac voltages and prevents decrease in the detection sensitivity due to the induction noises.

In a third modification having a first pair of tines 84 and 90 and a second pair of tines 86 and 92, the tines 86 and 90 have X-axis excitation means for exciting the tines 86 and 90 along the X axis while the other tines 84 and 92 have Y-axis vibration detecting means for detecting vibrations of the tines 84 and 92 along the Y axis. In this structure, the tine 86 is used for excitation, the tine 90 for harmonic vibrations, and the tines 84 and 92 for detecting the angular velocity.

In the same manner as the first modification, the first and the second excitation circuits 30 and 31 excite the tines 86 and 90, where the vibration mode is set as shown in the schematic view of FIG. 9. Alternating current voltages are applied onto the piezoelectric elements of the tines 86 and 90 under such a condition that the excitation ac voltages output from the second excitation circuit 31 and the excitation ac voltages output from the first excitation circuit 30 have an equiphase. The piezoelectric elements on the tine 90 contract with contraction of the piezoelectric elements on the tine 86, and expand with expansion of the piezoelectric elements on the tine 86. The tines 86 and 90 vibrate in the vibration mode shown in FIG. 9 through repetition of the expansion and contraction.

This vibration mode reverses the direction of vibrations of the tines 84 and 92 along the X axis, which are propagated from the tines 86 and 90. Like the first and the second modifications, the vibration-sensing gyro 80 of the third modification can effectively compensate for outputs due to external disturbances, thereby improving the detection sensitivity of the yaw rate.

Figure 10A:
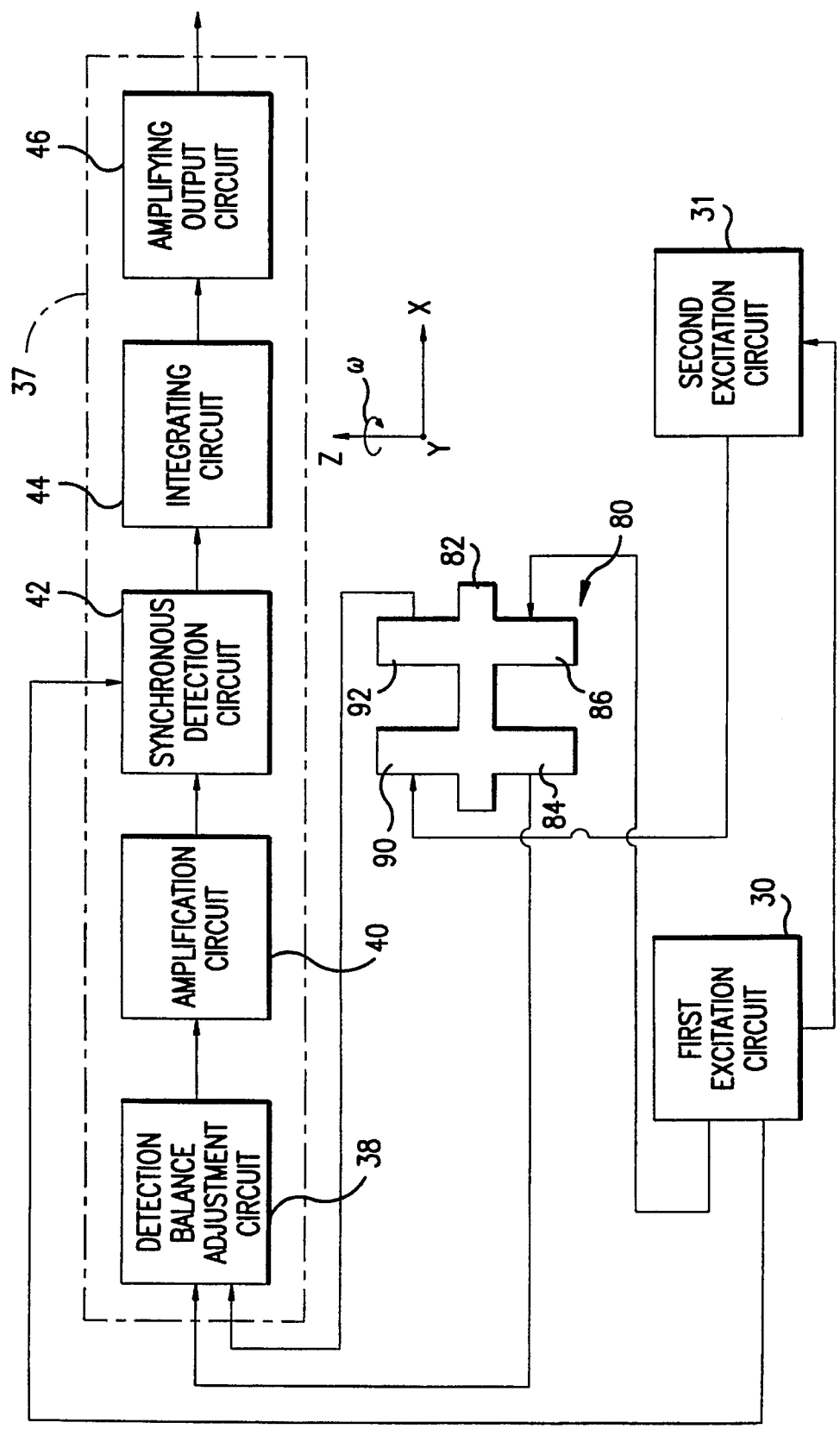
FIG. 10A is a block diagram showing a further alternative electrical structure including the vibration-sensing gyro 80.

The structure of the third modification of FIG. 10A has a diagonal arrangement of the excitation tines 86 and 90, which allows well-balanced excitation of the detection tines 84 and 92 at extremely high efficiency, thereby realizing highly sensitive outputs without being affected by external disturbances.

There may be many modifications, alterations, and changes without departing from the scope or spirit of essential characteristics of the invention. It is thus clearly understood that the above embodiments are only illustrative and not restrictive in any sense. For example, although the vibration-sensing gyro 80 of the first through the third modifications has two pairs of tines where two tines are used for excitation along the X axis, only one tine may be used for excitation along the X axis.

This modified structure has a first pair of tines 84 and 90 projecting in the opposite directions from the base 82 and a second pair of tines 86 and 92 also projecting in the opposite directions from the base 82 as shown in FIG. 7, where the tine 84 is excited to vibrate along the X axis. The tine 86 is made to detect vibrations of the tine 86 along the X axis while the tines 90 and 92 are constructed to detect vibrations of the tines 90 and 92 along the Y axis. Namely, the tine 84 is used for excitation, the tine 86 for feed-back control, and the tines 90 and 92 for detecting the angular velocity.

Figure 12:
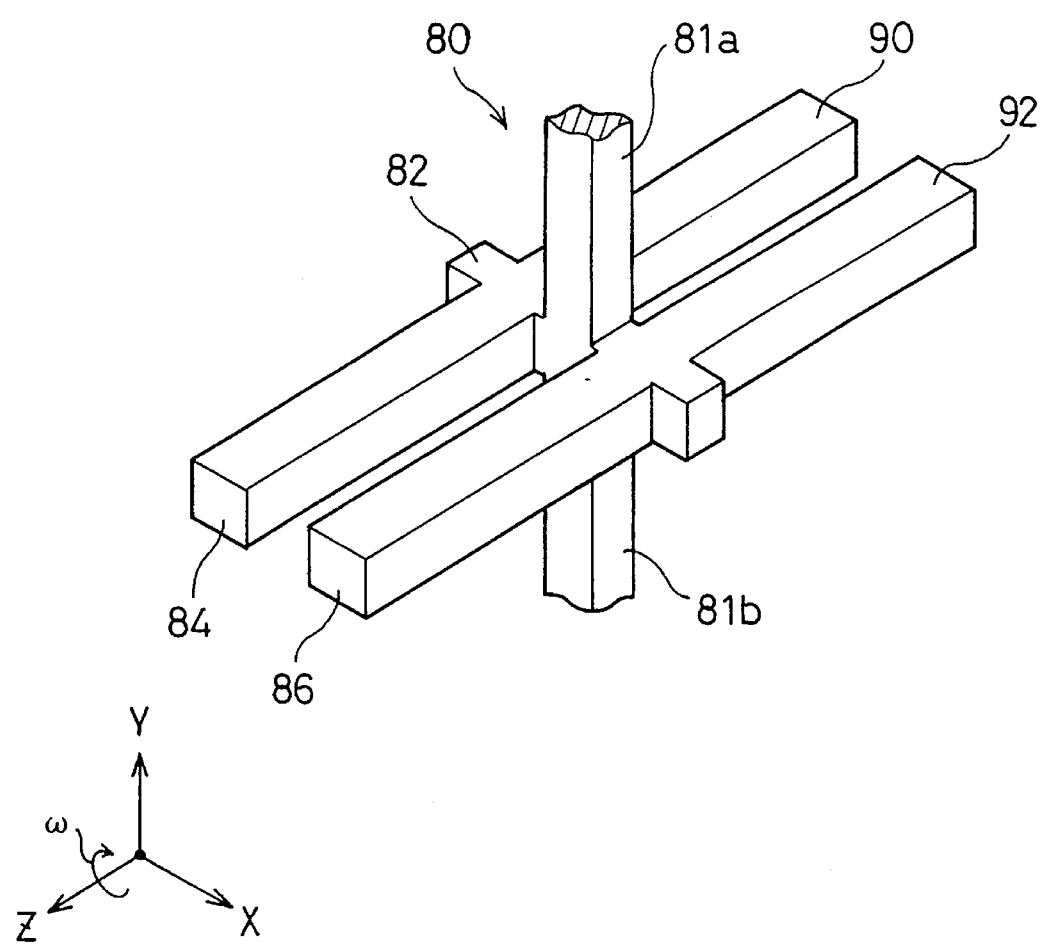
FIG. 12 is a perspective view schematically illustrating a modification of the vibration-sensing gyro 80.

The tine 84 has the X-axis excitation means, the tine 86 having X-axis vibration detecting means, and the tines 90 and 92 having the Y-axis vibration detecting means as described above. The tine 84 is efficiently excited on its root to vibrate along the X axis as described previously, and the vibrations of the tine 84 along the X axis are favorably propagated to the other tine 90 of the pair or the other pair of tines 86 and 92. In a further modified structure, the vibration-sensing gyro 80 may be fixed on a center of the base 82 by means of support columns 81a and 81b respectively protruding along the Y axis from the upper and the lower face of the base 82 as shown in FIG. 12. In this structure, the tines of the vibration-sensing gyro 80 are vibrated in the vibration mode shown in FIG. 9. The vibration-sensing gyro 80 having only one excitation tine 84 can improve the detection sensitivity of the yaw rate, like the vibration-sensing gyros of the first through the third modifications described above.

Figure 13:
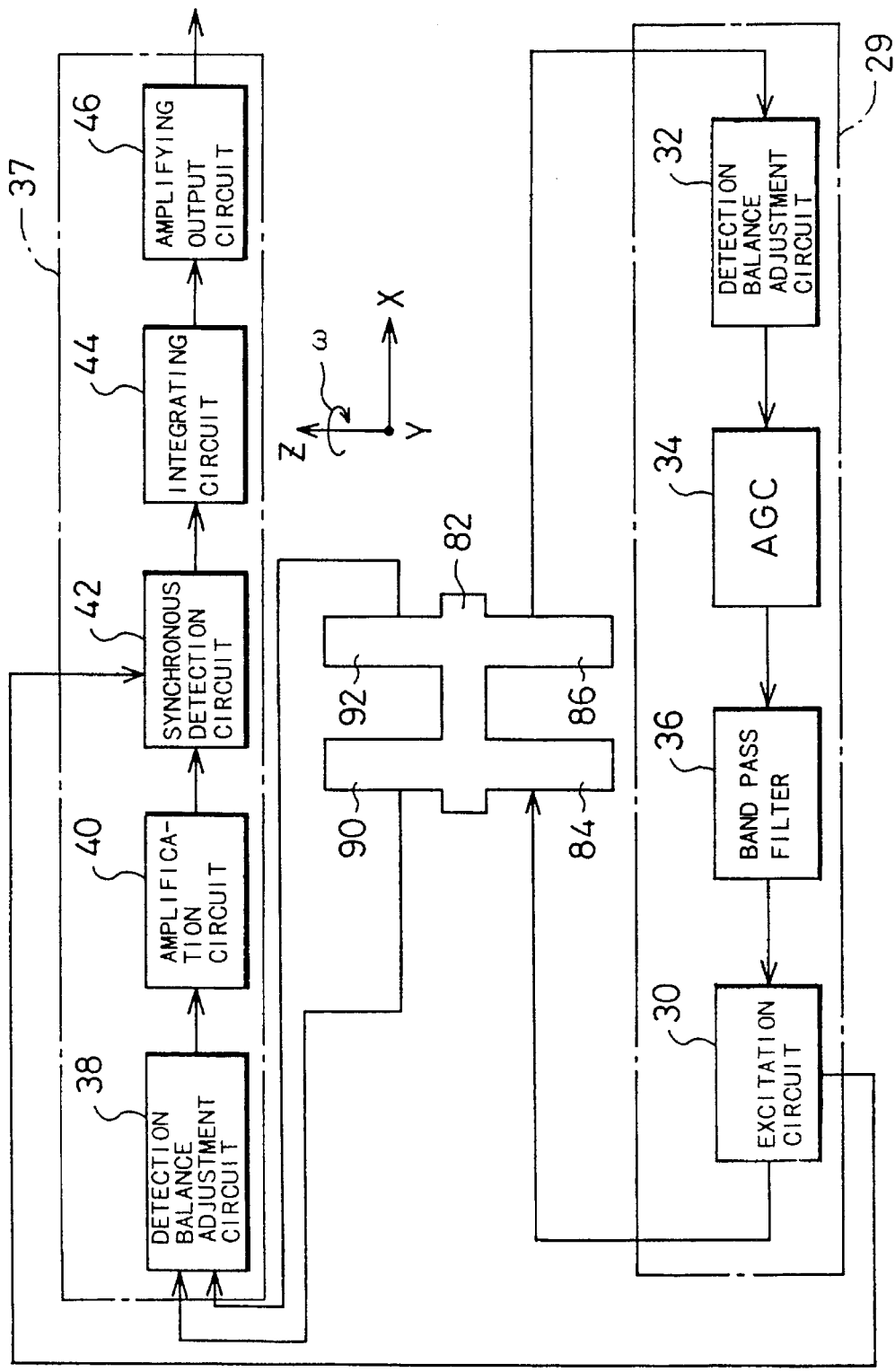
FIG. 13 is a block diagram illustrating an electrical structure including the vibration-sensing gyro 80 in the modified structure.

The vibration-sensing gyro 80 having only one tine 84 excited along the X axis may further be modified. As shown in FIG. 13, the X-axis excitation means of the tine 84 connects with the excitation circuit 30 in a driving circuit 29 whereas the X-axis vibration detecting means of the tine 86 connects with a detection balance adjustment circuit 32 in the driving circuit 29. The Y-axis vibration detecting means of the tines 90 and 92, on the other hand, connect with a detection balance adjustment circuit 38 of a detection circuit 37.

The driving circuit 29 includes the excitation circuit 30 described above, the detection balance adjustment circuit 32 for adjusting the phase of electric signals generated by the piezoelectric effects of the X-axis vibration detecting means like piezoelectric elements on the tine 86, an automatic gain controller (AGC) 34 for making the output level substantially constant irrespective of levels of the input electric signals, and a band pass filter 36 for selecting electric signals having a predetermined range of frequencies around a resonance frequency of the tine 84. The excitation circuit 30 of the driving circuit 29 applies ac voltages having a frequency identical with the resonance frequency of the tine 84 along the X axis to the X-axis vibration detecting means of the tine 86. The tine 84 accordingly vibrates along the X axis at its resonance frequency. The vibrations of the tine 84 along the X axis are then propagated to the other tines 86, 90, and 92 so as to make the tines 86, 90, and 92 vibrate along the X axis.

The vibrations of the tine 86 along the X axis are propagated through the detection balance adjustment circuit 32 and the band pass filter 36 to be converted to electric signals having a predetermined range of frequencies around the resonance frequency. The electric signals selected by the excitation circuit 30 are continuously applied onto the X-axis excitation means of the tine 84. This means that ac voltages having a substantially constant level and the resonance frequency of the tine 84 are continuously applied to the X-axis excitation means like piezoelectric elements on the tine 84. The tine 84 steadily vibrates at the resonance frequency along the X axis with a fixed amplitude while the other tines 86, 90, and 92 continuously vibrate along the X axis. The vibration-sensing gyro 80 of this modified structure can propagate the steady vibrations of the tine 84 along the X axis to the tines 90 and 92 for detecting the yaw rate, thus further improving the detection sensitivity of the yaw rate.

Like the vibration-sensing gyro 10 of the first embodiment, the detection circuit 37 includes the detection balance adjustment circuit 38, an amplification circuit 40, a synchronous detection circuit 42, an integrating circuit 44, and an amplifying output circuit 46. The detection circuit 38 outputs electric signals representing vibrations of the tines 90 and 92 along the Y axis due to the Coriolis force F to an electronic control system (not shown).

Figure 14:
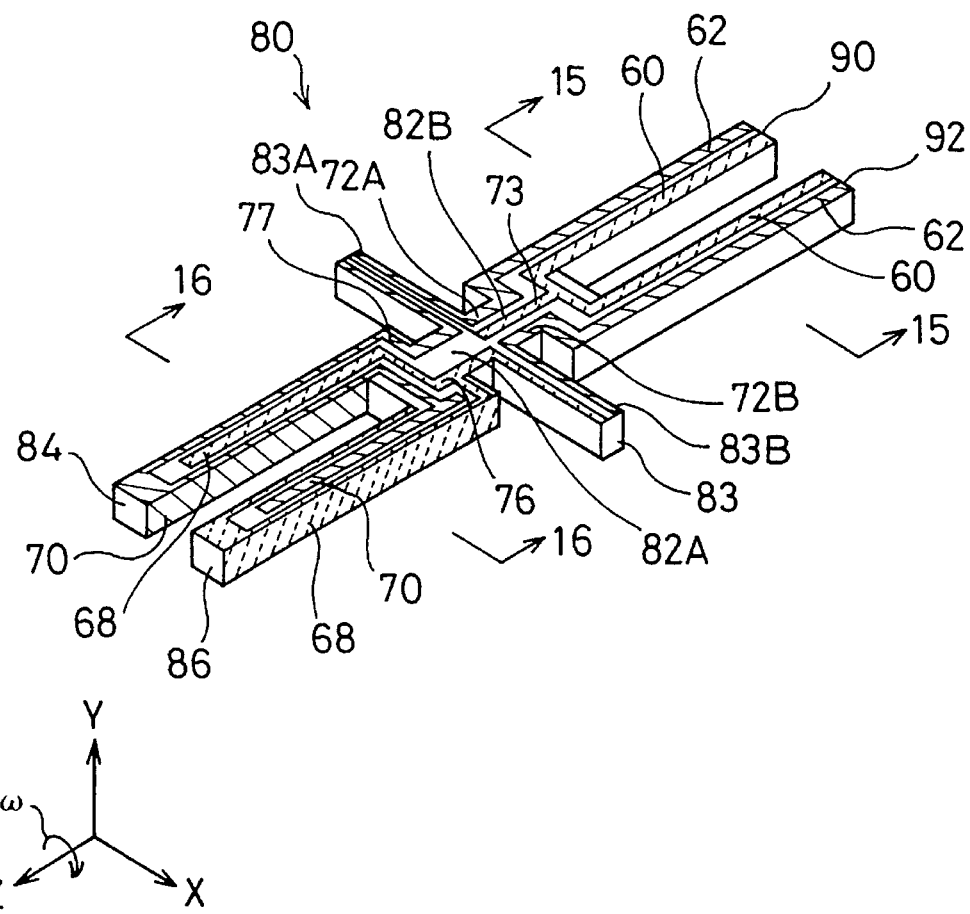
FIG. 14 is a perspective view schematically illustrating another modification of the vibration-sensing gyro 80.

In still another modified structure, the vibration-sensing gyro 80 includes two tuning forks fixed to each other via a base, where each tuning fork consists of two tines as shown in FIG. 14. The vibration-sensing gyro 80 has tines 84, 86, 90, and 92 like the first and the third modifications described above, in which the tines 84 and 86 project from a first base element 82A and the tines 90 and 92 project from a second base element 82B. The first base element 82A and the second base element 82B are joined with each other at a narrow joint 83, which supports both the tuning forks or the four tines. In the vibration-sensing gyro 80 shown in FIG. 14, the tines, the first and the second base elements, and the joint are integrally formed by etching a quartz crystal plate. Each tine has either electrodes for X-axis excitation or those for detecting Y-axis vibrations.

The quartz crystal plate used herein may be cut from a single quartz crystal at an inclination of 0 through 5 degrees from the direction of <0001> to the direction of <−1010>. A quartz crystal substrate used in this embodiment is cut from a single quartz crystal at an inclination of 2 degrees, where the longitudinal axis of each tine runs in the direction of <−1010>. This structure of the vibration-sensing gyro 80 shown in FIG. 14 allows excitation of tines along the X axis and detection of vibrations along the Y axis, thus attaining a stable frequency at ambient temperatures.

The vibration-sensing gyro 80 of the modified structure has a pair of tines 84 and 90 projecting in the opposite directions and another pair of tines 86 and 92 also projecting in the opposite directions. The tines 84 and 86 are excited to vibrate along the X axis whereas the tines 90 and 92 are constructed to detect vibrations of the tines 90 and 92 along the Y axis. Namely, the tine 84 is used for excitation, the tine 86 for harmonic vibrations, and the tines 90 and 92 for detecting the angular velocity.

Figure 15:
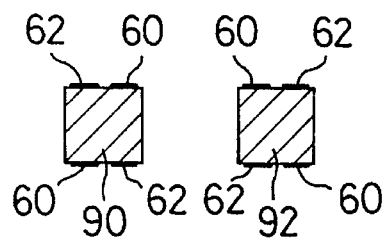
FIG. 15 is an enlarged cross sectional view taken on the line 15—15 of FIG. 14.
Figure 16:
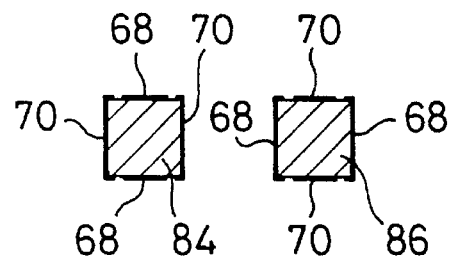
FIG. 16 is an enlarged cross sectional view taken on the line 16—16 of FIG. 14.

As shown in the enlarged cross sectional views of FIG. 15 and FIG. 16 respectively taken on the line 15—15 and the line 16—16 of FIG. 14, the tines 90 and 92 have positive electrodes 60 and negative electrodes 62 formed by known semiconductor technology like the first tine 54 of the vibration-sensing gyro 50 of the second embodiment while the other tines 84 and 86 have positive electrodes 68 and negative electrode 70 like the second tine 56 of the second embodiment. The first and the second base elements 82A and 82B and the joint 83 have a wiring 72A leading to the negative electrodes 62 on the tine 90, a wiring 72B leading to the negative electrodes 62 on the tine 92, a common wiring 73 connecting with the positive electrodes 60 on the tines 90 and 92, a common wiring 76 connecting with the positive electrodes 68 on the tines 84 and 86, and a common wiring 77 connecting with the negative electrodes 70 on the tines 84 and 86.

In the drawing of FIG. 14, the positive electrodes and the corresponding wirings are filled with the hatched broken lines while the negative electrodes and the corresponding wirings are filled with the hatched solid lines.

The negative electrodes 70 on both the side faces of the tine 84 are connected to each other at the end of the tine 84 and further connected to the negative electrodes 70 on the upper and the lower faces of the tine 86 on the upper surface of the first base element 82A. The positive electrodes 68 on both the side faces of the tine 86 are connected to each other at the end of the tine 86 and further connected to the positive electrodes 68 on the upper and the lower faces of the tine 84 on the upper surface of the first base element 82A. The common wiring 77 leading to the negative electrodes 70 of the tines 84 and 86 and the common wiring 76 leading to the positive electrodes 68 of the tines 84 and 86 are accordingly formed only on the upper faces of the first base element 82A and the joint 83. The common wiring 77 is formed on the upper face of a left projection 83A of the joint 83 to reach the end of the left projection 83A whereas the common wiring 76 is formed on the upper face of a right projection 83B of the joint 83 to reach the end of the right projection 83B. The wirings 73, 72A, and 72B leading to the positive electrodes 60 and the negative electrodes 62 of the tines 90 and 92 are formed on both the upper and the lower faces of the second base element 82B and the joint 83. The wirings 73 and 72A are formed on both the upper and the lower faces of the left projection 83A to reach the end of the left projection 83A while the wiring 72B is formed on both the upper and the lower faces of the right projection 83B to reach the end of the right projection 83B.

In the vibration-sensing gyro 80 having the two tuning forks, excitation of the tines 84 and 86 along the X axis results in vibrations of the tines 90 and 92 along the X axis. The Vibration-sensing gyro 80 shown in FIG. 14 can improve the detection sensitivity of the yaw rate like the vibration-sensing gyros of the first through the third modifications described above. This vibration-sensing gyro 80 includes two tuning forks joined with each other at the narrow joint 83. Even under the condition that the joint 83 is fixed to a fixation frame (not shown), this structure can effectively prevent vibrations of tines of the two tuning forks from propagating to the fixation frame.

The identical lengths, widths, thicknesses, and the cross sectional shapes of the tines 84, 86, 90, and 92 allow X-axis and Y-axis resonance frequencies of the tines 84 and 86 to coincide respectively with X-axis and Y-axis resonance frequencies of the tines 90 and 92. The tines receiving the Coriolis force move on a substantially circular orbit rather than the original elliptical orbit, which accordingly increases the amplitude of vibrations along the Y axis. The vibration-sensing gyro 80, made of metal plate, having such structure can thus further improve the detection sensitivity of the yaw rate. The tines of the vibration-sensing gyro 80 having the specific structure shown in FIG. 14 may, of course, be excited with piezoelectric elements as described previously.

The electrodes on the tines 84 and 86 for excitation and driving and the electrodes on the tines 90 and 92 for detecting vibrations are connected to a signal processing circuit as shown in FIG. 8. In such a circuit structure, the negative electrodes 70 of the tines 84 and 86 and the corresponding wiring 77 function as a ground potential in the excitation circuit whereas the negative electrodes 62 of the tines 90 and 92 and the corresponding wirings 72A and 72B function as a ground potential in the detection circuit. The positive electrodes 68 used for excitation are thus sufficiently separated from the positive electrode 60 used for detection on the joint 83. The wirings 76 and 73 for the positive electrodes can also be apart from each other on the joint 83 and not arranged adjacent to or parallel to each other. The wiring 76 for the excitation positive electrodes may, on the other hand, be arranged adjacent to or parallel to the wiring 77 for the negative electrodes set as the ground potential. The wiring 73 for the detection positive electrodes may be arranged adjacent to or parallel to the wirings 72A and 72B for the negative electrodes set as the ground potential.

Such arrangement effectively prevents the ac electric field-induction noises due to application of the excitation ac voltages onto the excitation positive electrodes and the corresponding wiring from overlapping the detection positive electrodes and the corresponding wiring. Prevention of the overlapping specifically reduces the noise components of electric signals in the detection positive electrodes and the corresponding wiring, thereby enhancing the detection sensitivity. The same effects can be obtained by an alternative signal processing circuit (not shown) in which the wiring 77 is connected to the positive electrodes for excitation, the wirings 72A and 72B being connected to the positive electrodes for detection, the wiring 76 being set as the ground potential for excitation, and the wiring 73 being set as the ground potential for detection.

The vibration-sensing gyro 80 shown in FIG. 14 has two excitation tines which are driven or excited to be in an antiphase, and thereby ensures stable vibrations of the excitation tines along the X axis. The vibrations along the X axis are efficiently propagated to the other tines for detection via the first base element 82A and the second base element 82B formed to have a constricted shape. The vibration-sensing gyro 80 can accordingly detect the angular velocity-induced deviation along the Y axis with high sensitivity via the electrodes formed on the detection tines. The sufficient separation of the excitation electrodes and the corresponding wiring from the detection electrodes and the corresponding wiring ensures the improvement in excitation efficiency and detection efficiency, thus allowing high outputs of the angular velocity and enhancing the stability of detection signals.

In the vibration-sensing gyro 80 shown in FIG. 14, the excitation tine 84, the harmonic vibration tine 86, and the two detection tines 90 and 92 have the identical cross-sectional shapes and the lengths. This ensures the efficient transmission of vibrations of the excitation tine along the X axis to the detection tines and allows the detection tines to detect the angular velocity-induced vibrations along the Y axis with high efficiency.

In the vibration-sensing gyro 80 shown in FIG. 14, the joint 83 projects perpendicular to the four tines and symmetrically in opposed directions from the middle of the constricted shape of the first base element 82A and the second base element 82B. The vibration-sensing gyro 80 is fixed to a sensor case (not shown) via the joint 83. This arrangement preferably keeps the symmetrical characteristics both in the directions of the X axis and the Y axis, and prevents the excited vibrations along the X axis and the angular velocity-induced vibrations along the Y axis from being transmitted outside of the vibration-sensing gyro 80. No outside transmission of vibrations preferably increases the amplitude of the excited vibrations and thereby the amplitude of the angular velocity-induced vibrations. This also allows a simple packaging of the sensor and ensures stable outputs over the temperature change and the long-time operations.

The joint 83 positioning on the center of the connection of the four tines and extending perpendicular to the four tines is fixed to the sensor case (not shown). The joint 83 on the center of the connection of the four tines is accordingly positioned on the node of vibrations. This structure does not interfere with vibrations of each tine and effectively prevents the vibrations from being transmitted outside. The fixation of the joint 83 parallel to the X-axis vibrations allows the vibration-sensing gyro 80 to have a sufficiently high strength against large vibrations due to the excitation along the X axis.

In the structure that the joint 83 is fixed to the sensor case, the wirings leading to the electrodes on the tines can be formed on the upper and the lower faces and the two side faces of the joint 83. In the vibration-sensing gyro 80, three wirings are formed on the upper face of the left projection 83A of the joint 83 whereas two wirings are formed on the upper face of the right projection 83B. The wirings for excitation and those for detection can be arranged separately on the left projection 83A and the right projection 83B of the joint 83, or alternatively on the upper and the lower faces of the joint 83. This arrangement effectively prevents mutual interference of the excitation ac voltages applied onto the excitation wirings with the detection signals detected via the detection wirings.

In still another modified structure, the vibration-sensing gyro 80 excites vibrations along the Y axis and detects angular velocity-induced vibrations along the X axis, instead of exciting vibrations along the X axis and detecting angular velocity-induced vibrations along the Y axis. In this case, the excitation ac voltages are applied onto the detection electrodes while the angular velocity-induced voltages generated on the excitation electrodes are detected.

A certain mass may further be mounted separately from the electrodes on the end of each tine. Increase or decrease in the mass by means of vapor deposition, laser abrasion, adhesion, or grinding results in adjustment of the resonance frequency of each tine. The mass positioned on the end of each tine allows simple adjustment of each tine and effectively matches the vibration balance of the excitation tines to the vibration balance of the detection tines. The well-matched vibration balance increases the amplitude of vibrations along the X axis to improve the detection sensitivity, and prevents the vibrations from being transmitted outside so as to improve the stability of the sensor. This structure has another advantage of not being affected substantially by external disturbances. The resonance frequency of the excitation tines along the X axis and the resonance frequency of the detection tines along the Y axis may be set to have a predetermined relationship. Coincidence of the two resonance frequencies, for example, ensures the extremely high sensitivity.

In the vibration-sensing gyro of the invention, one of two tines is excited to vibrate while the vibration is propagated to the other tine via a base, so that each tine is in vibration along the one axis (for example, X axis) in the system of right-angled coordinates. The other tine detects vibrations of the tine along the Y axis generated by the Coriolis force when the vibration-sensing gyro rotates around an axis (Z axis) perpendicular to a plane which contains rectangular coordinate axis. In the vibration-sensing gyro of the invention, each tine has either one of the excitation means and the detection means. This simplifies and down-sizes the entire structure of the vibration-sensing gyro.

The vibration-sensing gyro of the invention has the excitation means or the detection means separately attached on the root of a tine having a large crystal distortion, thereby allowing efficient excitation of the tine and highly sensitive detection of the Coriolis force. The vibration-sensing gyro of the invention can be designed and constructed without taking account of interference of wirings for power supply with the excitation means or the detection means. The vibration-sensing gyro of the invention accordingly has thick wirings for application of high voltages and allows each tine to vibrate with a high frequency so as to improve the sensitivity of detection.

What is claimed is:

1. A vibration-sensing gyro comprising:
    a twin-fork vibration sensing element comprising:
        a first tuning fork comprising first and second tines and a base, a width of the base of the first tuning fork being less than the width of the first tuning fork;
        a second tuning fork comprising first and second tines and a base, a width of the base of the second tuning fork being less than the width of the second tuning fork;

the first tuning fork being joined to the second tuning fork by the bases of the first and second tuning forks;

a first excitation means on the first tuning fork, the excitation device vibrating the first tuning fork along a first axis;

a first detection means on the second tuning fork, the first detection means detecting vibrations in the second tuning fork in an axis orthogonal to the first axis, which vibrations in the second tuning fork are propagated from vibrations in the first tuning fork.

2. A vibration-sensing gyro in accordance with claim 1, wherein said vibration-sensing element is composed of a quartz crystal;

said first excitation means comprises an excitation electrode mounted on said first tine for vibrating said first tine along said one axis; and said first detection means comprises a detection electrode mounted on said second tine for detecting vibrations of said second tine.

3. A vibration-sensing gyro in accordance with claim 2, wherein said vibration-sensing element is composed by etching a quartz crystal wafer having a predetermined thickness; and a ratio of a width of each of said first and second tines on the surface of said quartz crystal wafer to said predetermined thickness is within a range of about 0.5 through about 1.3.

4. The vibration-sensing gyro of claim 1, further comprising:

a support column, the bases of the first and second tuning forks being joined to the support column, the support column projecting in a direction orthogonal to the bases of the first and second tuning forks.

5. A vibration-sensing gyro in accordance with claim 4, wherein said projection is arranged parallel to said one axis.

6. A vibration-sensing gyro in accordance with claim 4, wherein said vibration-sensing element is composed of a quartz crystal;

said first excitation means comprises an excitation electrode mounted on one of said tines of said first tuning fork;

said first detection means comprises a detection electrode mounted on one of said tines of said second tuning fork;

said vibration-sensing gyro further comprising:

a positive wiring for applying a voltage onto said excitation electrode and a positive wiring for applying a voltage onto said detection electrode being separately disposed at different sides of said joint on said projection.

7. A method of detecting a yaw rate observed in a vehicle, said method comprising the steps of:

mounting a vibration-sensing gyro in accordance with claim 1 on the vehicle;

outputting an excitation signal to said first excitation means of said vibration-sensing gyro mounted on the vehicle to vibrate the first tuning fork along the one axis;

receiving results of detection by said first detection means of said vibration-sensing gyro and calculating the yaw rate based on the results of detection.

8. A method of detecting a yaw rate observed in a vehicle, said method comprising the steps of:

mounting a vibration-sensing gyro in accordance with claim 2 on the vehicle;

outputting an excitation signal to said first excitation means of said vibration-sensing gyro mounted on the vehicle to vibrate the first tuning fork along the one axis;

receiving results of detection by said first detection means of said vibration-sensing gyro and calculating the yaw rate based on the results of detection.

9. A method of detecting a yaw rate observed in a vehicle, said method comprising the steps of:

mounting a vibration-sensing gyro in accordance with claim 5 on the vehicle;

outputting an excitation signal to said first excitation means of said vibration-sensing gyro mounted on the vehicle to vibrate the first tuning fork along the one axis;

receiving results of detection by said first detection means of said vibration-sensing gyro and calculating the yaw rate based on the results of detection.

10. A method of detecting a yaw rate observed in a vehicle, said method comprising the steps of:

mounting a vibration-sensing gyro in accordance with claim 6 on the vehicle;

outputting an excitation signal to said first excitation means of said vibration-sensing gyro mounted on the vehicle to vibrate the first tuning fork along the one axis;

receiving results of detection by said first detection means of said vibration-sensing gyro and calculating the yaw rate based on the results of detection.

* * * * *

UNITED STATES PATENT AND TRADEMARK OFFICE
CERTIFICATE OF CORRECTION

PATENT NO. : 5,585,562

Page 1 of 2

DATED : December 17, 1996

INVENTOR(S) : Nobuo KURATA et al.

It is certified that error appears in the above-indentified patent and that said Letters Patent is hereby corrected as shown below:

| Column | Line  |                                                              |
|--------|-------|--------------------------------------------------------------|
| 1      | 18    | Change "axis" to --axes--.                                   |
| 1      | 27-28 | Change "LAYING-OPENGAZETTE" to --LAYING-OPEN GAZETTE--.      |
| 2      | 46    | Change "forth" to --fourth--.                                |
| 2      | 48    | Change "forth" to --fourth--.                                |
| 2      | 54    | Change "forth" to --fourth--.                                |
| 3      | 3     | change "equipbase" to --equiphase--.                         |
| 3      | 6     | Before "third" delete "the".                                 |
| 3      | 9     | Change "the forth" to --fourth--.                            |
| 3      | 11    | Change "forth" to --fourth--.                                |
| 3      | 24    | Change "forth" to --fourth-- (two occurrences).              |
| 3      | 33    | Change "forth" to --fourth--.                                |

UNITED STATES PATENT AND TRADEMARK OFFICE
CERTIFICATE OF CORRECTION

PATENT NO. : 5,585,562
DATED : December 17, 1996
INVENTOR(S) : Nobuo KURATA et al.

It is certified that error appears in the above-indentified patent and that said Letters Patent is hereby corrected as shown below:

| Column | Line | |
|---|---|---|
| 6 | 17 | After "force" insert --F--. |
| 6 | 25 | After "vibrating" insert --mass--; after "axis" delete "mass". |
| 6 | 33 | Change "F=1/T" to --f=1/T--. |
| 7 | 9 | After "structure" insert --in--. |
| 7 | 50 | Change "FIG. 4 and FIG. 6" to --FIG. 4, and in FIG. 6,--. |
| 11 | 6 | Change "efficiently" to --effectively--. |
| 14 | 62 | Change "the" to --those--. |

Signed and Sealed this

Third Day of June, 1997

Attest:

BRUCE LEHMAN

Attesting Officer    Commissioner of Patents and Trademarks

REEXAMINATION CERTIFICATE (4330th)
United States Patent
Kurata et al.

(10) Number: US 5,585,562 C1
(45) Certificate Issued: May 1, 2001

(54) VIBRATION-SENSING GYRO

(75) Inventors: Nobuo Kurata, Hekinan; Nobuyoshi Sugitani, Toyota; Takashi Ozaki, Nagoya; Kenji Harada; Kimitoshi Tsuji, both of Toyota; Yutaka Nonomura, Nagoya; Takeshi Morikawa, Seto; Masayuki Okuwa, Nagoya; Kouji Tsukada, Seto, all of (JP)

(73) Assignee: Gamemax Corporation, Taipei (TW)

Reexamination Request:
No. 90/005,440, Aug. 2, 1999

Reexamination Certificate for:
Patent No.: 5,585,562
Issued: Dec. 17, 1996
Appl. No.: 08/640,399
Filed: Apr. 30, 1996

Certificate of Correction issued Jun. 3, 1997.

Related U.S. Application Data

(63) Continuation of application No. 08/318,392, filed on Oct. 5, 1994, now abandoned.

(30) Foreign Application Priority Data

Oct. 15, 1993 (JP) .................................................. 5-281596

(51) Int. Cl.$^7$ ........................................................ G01P 9/04
(52) U.S. Cl. ................................................................ 73/504.16
(58) Field of Search ............................ 73/504.12, 504.15, 73/504.16

(56) References Cited

U.S. PATENT DOCUMENTS 4,930,351 * 6/1990 Macy et al. ........................ 73/504.16

OTHER PUBLICATIONS

"Quartz gyro goes out for a spin", New Scientist, Nov. 30, 1991, p. 26.*
"Solid–State Gyro Borrows Wristwatch Technology," Machine Design, Sep. 24, 1992, p. 32.*
"Advances on the Gyroscope Front," New York Times, Oct. 30, 1991, p. D9.*
"Une Centrale Inertielle Dans Un Bouchon De Champagne," Science et Vie, May 1992, pp. 104–109.*

* cited by examiner

*Primary Examiner*—John E Chapman

(57) ABSTRACT

A vibration-sensing gyro composed of a light alloy such as duralumin includes a base and a first pair of tines projecting parallel to each other from the base. Piezoelectric elements are mounted on the root of the side faces of the first pair of tines to excite the first pair of tines along an X axis. The vibrations of the first pair of tines along the X axis are then propagated to a second pair of tines to vibrate the second pair of tines along the X axis. Piezoelectric elements are mounted on the root of the upper and the lower faces of the second pair of tines to detect vibrations of the second pair of tines along an Y axis. When the second pair of tines receives the Coriolis force based on an angular velocity ω around a Z axis and vibrates along the Y axis, the vibrations along the Y axis are detected as electric signals (alternating current voltages) by piezoelectric effects of the piezoelectric elements.

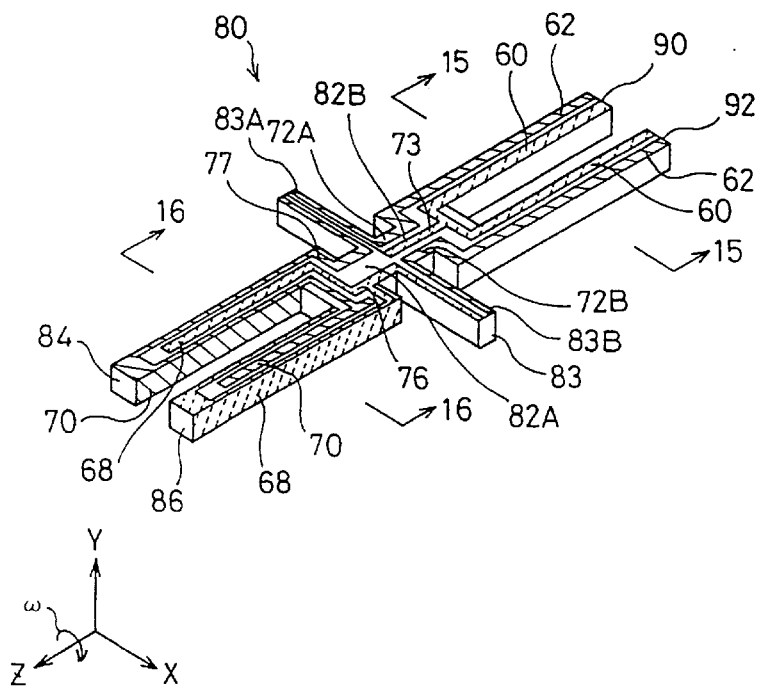

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–10 are cancelled.

* * * * *